United States Patent
Abd Elhamid et al.

(10) Patent No.: US 7,300,719 B2
(45) Date of Patent: Nov. 27, 2007

(54) POROUS DIFFUSION MEDIA AND BIPOLAR PLATE ASSEMBLY WITH ANION EXCHANGE RESIN AND DEVICES INCORPORATING SAME

(75) Inventors: Mahmoud H. Abd Elhamid, Grosse Pointe Woods, MI (US); Youssef M. Mikhail, Sterling Heights, MI (US); Richard H. Blunk, Macomb Township, MI (US)

(73) Assignee: General Motors Corporation, Detroit, MI (US)

( * ) Notice: Subject to any disclaimer, the term of this patent is extended or adjusted under 35 U.S.C. 154(b) by 323 days.

(21) Appl. No.: 10/911,851

(22) Filed: Aug. 5, 2004

(65) Prior Publication Data

US 2006/0029859 A1    Feb. 9, 2006

(51) Int. Cl.
*H01M 4/00* (2006.01)
(52) U.S. Cl. .......................................... 429/40; 429/42
(58) Field of Classification Search ...................... None
See application file for complete search history.

(56) References Cited

U.S. PATENT DOCUMENTS

| | | | | |
|---|---|---|---|---|
| 4,804,592 A | * | 2/1989 | Vanderborgh et al. | 429/33 |
| 4,828,941 A | * | 5/1989 | Sterzel | 429/33 |
| 5,620,807 A | * | 4/1997 | Mussell et al. | 429/33 |
| 5,728,485 A | * | 3/1998 | Watanabe et al. | 429/41 |
| 5,773,162 A | * | 6/1998 | Surampudi et al. | 429/39 |
| 5,863,673 A | * | 1/1999 | Campbell et al. | 429/44 |
| 6,127,059 A | * | 10/2000 | Kato | 429/40 |
| 6,391,487 B1 | * | 5/2002 | Totsuka | 429/41 |

\* cited by examiner

*Primary Examiner*—Rick Joseph Ryan
*Assistant Examiner*—Julian Mercado

(57) ABSTRACT

A device comprising a membrane electrode assembly, porous diffusion media, and at least one pair of bipolar plate assemblies is provided. The membrane electrode assembly is interposed between a pair of diffusion media substrates, the bipolar plate assembly comprises at least one flow field passage, and the bipolar plate assembly engages the diffusion media substrate. The diffusion media substrate comprises a fibrous matrix defining opposing first and second major faces. The substrate comprises an amount of carbonaceous material sufficient to render the substrate electrically conductive. An anion exchange resin layer engages at least a portion of at least one of the first and second major faces of the diffusion media substrate and/or the flow field passage. The anion exchange resin is configured to eliminate anions through exchange with hydroxyl groups or formation of quaternary ammonium salts.

24 Claims, 2 Drawing Sheets

POROUS DIFFUSION MEDIA AND BIPOLAR PLATE ASSEMBLY WITH ANION EXCHANGE RESIN AND DEVICES INCORPORATING SAME

BACKGROUND OF THE INVENTION

The present invention relates to porous diffusion media, bipolar plate assemblies, fuel cells employing porous diffusion media and bipolar plate assemblies according to the present invention, and fuel cell powered systems incorporating such fuel cells. More particularly, the present invention is related to porous diffusion media and bipolar plate assemblies with anion exchange resin and devices incorporating same.

SUMMARY OF THE INVENTION

Solid-acid membrane-electrode-assembly (MEA) materials are known to both thermally and chemically degrade inside of proton exchange membrane (PEM) fuel cells, releasing fluoride ions, which, in turn, corrode metallic bipolar plate materials (e.g., stainless alloys). Hydrogen fluoride aggressively attacks metallic materials even though the acid is considered a weak acid. The plate corrosion byproducts—metal cations—then exchange with exchange sites in the polymer membrane and the catalyst ionomer layer, resulting in the following: a) a decrease in MEA conductivity as acid groups are released, b) a significant decrease in the rate of oxygen reduction on the cathode-side of the cell, and c) a general degradation of fuel cell performance. Minimizing the concentration of fluoride ions in the fuel cell environment would enhance the durability of the bipolar plates and the other metallic components in the fuel cell system that carries the exhaust water. As such, there is a recognized need for improvements in fuel cell design.

The present invention fulfills this need by employing anion exchange resins that are known to eliminate anions in many industrial applications. Although the present invention is not limited to specific advantages or functionality, it is noted that the use of anion exchange resins in the manner described herein effectively a) eliminates fluoride ions from the fuel cell environment, b) minimizes the corrosion of the bipolar plate materials (e.g., titanium, aluminum, stainless steel), c) decreases the metal cations leach out rate, d) increases the useful lifetime of the bipolar plate and the MEA, and d) improves the fuel cell durability and performance.

In accordance with one embodiment of the present invention, a porous diffusion media is provided comprising a diffusion media substrate and an anion exchange resin layer. The diffusion media substrate comprises a fibrous matrix defining opposing first and second major faces. The substrate comprises an amount of carbonaceous material sufficient to render the substrate electrically conductive. The anion exchange resin layer engages at least a portion of at least one of the first and second major faces of the diffusion media substrate. The anion exchange resin is configured to eliminate anions through exchange with hydroxyl groups or formation of quaternary ammonium salts.

In accordance with another embodiment of the present invention, a device comprising a membrane electrode assembly, porous diffusion media, and at least one pair of bipolar plate assemblies is provided. The porous diffusion media comprises a diffusion media substrate and an anion exchange resin layer. The diffusion media substrate comprises a fibrous matrix defining opposing first and second major faces. The diffusion media substrate comprises an amount of carbonaceous material sufficient to render the substrate electrically conductive. The anion exchange resin layer engages at least a portion of at least one of the first and second major faces of the diffusion media substrate. The anion exchange resin is configured to eliminate anions through exchange with hydroxyl groups or formation of quaternary ammonium salts. The membrane electrode assembly is interposed between a pair of the diffusion media substrates. The bipolar plate assembly engages the anion exchange resin layer.

The device can comprise a fuel cell, and the device can further comprise structure defining a vehicle powered by the fuel cell. Typically, the anion exchange resin layer engages the first major face of the diffusion media substrate, and the bipolar plate assembly engages the anion exchange resin layer. Optionally, the anion exchange resin layer further engages the second major face of the diffusion media substrate, and the membrane electrode assembly engages the anion exchange resin layer that engages the second major face of the diffusion media substrate.

In accordance with yet another embodiment of the present invention, a device comprising a membrane electrode assembly, porous diffusion media, and at least one pair of bipolar plate assemblies is provided. The membrane electrode assembly is interposed between a pair of diffusion media substrates. The bipolar plate assembly comprises at least one flow field passage comprising an anion exchange resin layer. The anion exchange resin layer is configured to eliminate anions through exchange with hydroxyl groups or formation of quaternary ammonium salts. The bipolar plate assembly engages the diffusion media substrate.

In accordance with still yet another embodiment of the present invention, a porous diffusion media is provided comprising a diffusion media substrate and an anion exchange resin layer. The diffusion media substrate comprises a fibrous matrix defining opposing first and second major faces, wherein the substrate comprises an amount of carbonaceous material sufficient to render the substrate electrically conductive. The substrate further defines a thickness of about 0.17 mm. The anion exchange resin layer engages at least a portion of at least one of the first and second major faces of the diffusion media substrate. The anion exchange resin is configured to eliminate anions through exchange with hydroxyl groups or formation of quaternary ammonium salts, and the anion exchange resin comprises at least one of strong base anion exchange resins, weak base anion exchange resins, and combinations thereof. The anion exchange resin layer defines a thickness that is sufficient to remove free mineral and organic acids from solution. The thickness of the anion exchange resin layer is between about 10 and about 30 µm. The anion exchange resin layer infiltrates the diffusion media substrate. The anion exchange resin layer is characterized by a porosity greater than a porosity of the fibrous matrix of the diffusion media substrate.

These and other features and advantages of the invention will be more fully understood from the following detailed description of the invention taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of specific embodiments of the present invention can be best understood when read in conjunction with the following drawings, where like structure is indicated with like reference numerals and in which.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiment(s) of the present invention.

DETAILED DESCRIPTION OF SOME EMBODIMENTS OF THE INVENTION

Thermal/chemical degradation of the membrane material in an electrochemical conversion assembly (e.g., PEM fuel cell) results in the formation of hydrogen fluoride (HF), which aggressively attacks metallic materials even though the acid is typically considered a weak acid. The aggressive nature of fluoride ions comes as a result of its ability to attack passive films that are known to protect highly corrosion resistant materials such as stainless steel, titanium, aluminum and other stainless alloys. For example, fluoride ions can destabilize the passive oxide on stainless steel therefore making it more prone to corrosion. This same effect can be shown for titanium, wherein fluoride ions attack titanium oxide (one of the most stable of the oxides) and corrode the titanium considerably. The aggressive nature of fluoride ions can be beneficial in some applications, such as etching of stainless alloys and titanium for surface preparation and to remove residual contaminants from their surfaces. However, minimizing the concentration of fluoride ions in a fuel cell environment enhances the durability of the bipolar plates and other metallic components in the fuel cell system which carry the exhaust water. In accordance with the several embodiments of the present invention, an anion exchange resin can be employed to eliminate such anions.

There are two general types of anion exchange resins. The first are strong base anion exchange resins with hydroxyl groups, which resins eliminate anions through the exchange with the hydroxyl groups as shown below:

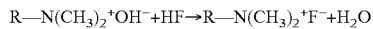

This type of resin is known to have limited thermal stability (e.g., stable up to about 60° C.). A second type of anion exchange resins are weak base anion exchange resins, which eliminate anions through the formation of quaternary ammonium salts as shown below:

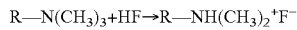

This type of anion exchange resin is stable for up to about 7 years and up to about 100° C.

Anion exchange resins are available from The Dow Chemical Company (Midland, Mich.) under the name DOWEX™, which is an immobilized base. Such anion exchange resins act as acid absorbers. It removes acid from solution and neutralizes, but releases nothing back into the solution that will produce a sludge or change the process stream. For example, DOWEX™ M-43 anion exchange resin is a versatile acid adsorber that can remove both mineral and organic acids including, for example, HCl, HBr, HF, HI, $H_2SO_4$, $H_3PO_4$, acetic, formic, propionic, and benzoic acid.

Figure 1:
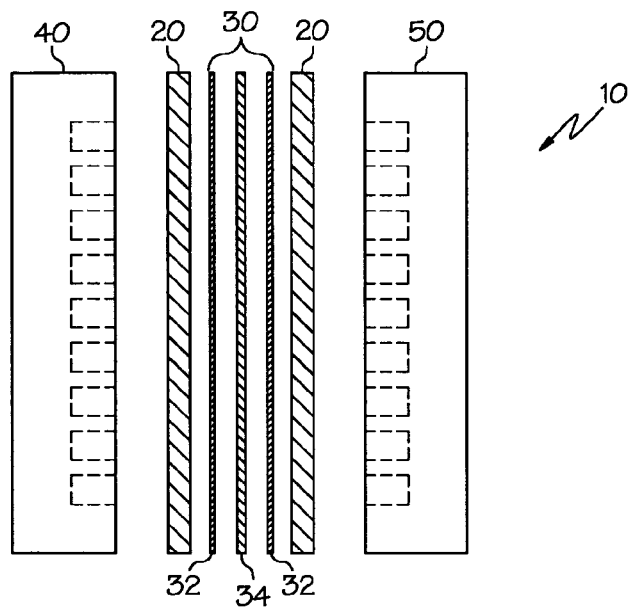
FIG. 1 is an exploded schematic illustration of a fuel cell incorporating a porous diffusion media and pair of flow field plates according to the principals of the present invention.

Referring initially to FIG. 1, an electrochemical conversion assembly 10 incorporating a porous diffusion media 20 according to the present invention is illustrated. Specifically, the assembly 10 comprises a membrane electrode assembly 30 interposed between an anode flow field 40 and a cathode flow field 50 of the assembly 10. The anode and cathode flow fields 40, 50 can each be configured as bipolar plates by incorporating anode and cathode flow field passages into opposite faces of a conductive plate. As understood by those skilled in the art, such plates are referred to as bipolar plates since the plates generally contact the cathode of one cell and the anode of an adjacent cell when a fuel cell stack is formed. It is further contemplated that the flow fields 40, 50 and the membrane electrode assembly 30 may take a variety of conventional or yet to be developed forms without departing from the scope of the present invention. Although the particular form of the membrane electrode assembly 30 is beyond the scope of the present invention, in the illustrated embodiment, the membrane electrode assembly 30 includes respective catalytic electrode layers 32 and an ion exchange membrane 34.

Figure 2:
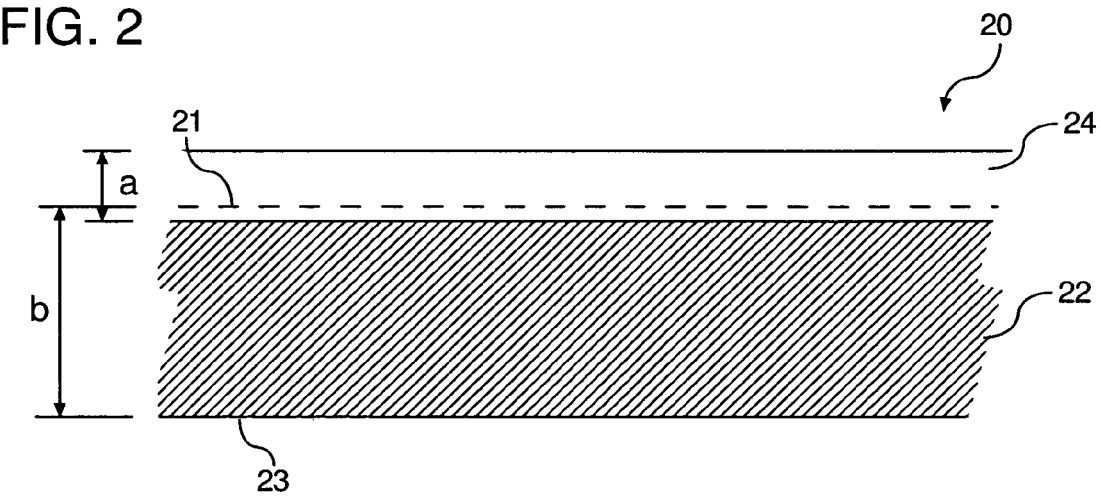
FIG. 2 is a schematic illustration of a porous diffusion media according to one embodiment of the present invention.

Referring now to FIG. 2, a porous diffusion media 20 according to one embodiment of the present invention is illustrated schematically. The diffusion media 20 comprises a diffusion media substrate 22 and an anion exchange resin layer 24. The diffusion media substrate 22 comprises a fibrous matrix, e.g., carbon fiber paper, defining opposing first and second major faces 21, 23 and an amount of carbonaceous material sufficient to render the substrate 22 electrically conductive. In the illustrated embodiment, the anion exchange resin layer 24 is engaging the first major face 21 of the diffusion media substrate 22. However, as noted herein, it is further contemplated that the anion exchange resin layer 24 can engage the second major face 23, or both the first and second major faces 21, 23 of the diffusion media substrate 22.

In many embodiments of the present invention, the anion exchange resin layer 24 is more effective in removing F ions and the acidity from the product water if it is positioned against the bipolar plate assembly and, more particularly, adjacent the face of the anode and/or cathode flow field 40, 50 of the electrochemical conversion assembly 10, as opposed to being positioned against the membrane electrode assembly 30. Nevertheless, it is contemplated that the diffusion media substrate 22 can engage the anion exchange resin layer 24 along either major face 21, 23 of the substrate 22 regardless of which face is positioned against the membrane electrode assembly 30. Further, the anion exchange resin layer 24 may cover all or a portion of the major face 21, 23 that it is engaged with. The anion exchange resin layer 24 is characterized such that it does not affect the contact resistance between the diffusion media substrate 22 and the bipolar plate.

For the purposes of defining and describing the present invention, it is noted that the anion exchange resin layer 24 is configured to eliminate anions (e.g., fluorides, chlorides, sulfates, sulfites, etc.) through exchange with hydroxyl groups or formation of quaternary ammonium salts, as noted above. As such, the anion exchange resin employed in forming the anion exchange resin layer 24 can be comprised of at least one of strong base anion exchange resins (e.g., DOWEX™ 22, DOWEX™ MSA-2, etc., available from The Dow Chemical Company, Midland, Mich.), weak base anion exchange resins (e.g., DOWEX™ MARATHON WBA, DOWEX™ MARATHON WBA-2, DOWEX™ MONOSPHERE 66, DOWEX™ 66, DOWEX™ M-43, DOWEX™ M4195, etc., available from The Dow Chemical Company, Midland, Mich.), and combinations thereof. Moreover, the anion exchange resin layer 24 is characterized by pore sizes that can range from between about a few nanometers to about hundreds of nanometers. In some embodiments of the present invention, it may be advantageous to configure the anion exchange resin layer 24 such that it is more porous than the fibrous matrix of the diffusion media substrate 22.

As further illustrated in FIG. 2, the anion exchange resin layer 24 can at least partially infiltrate the diffusion media substrate 22. The extent of infiltration, illustrated schematically by showing the first major face 21 in phantom in FIG. 2, can vary depending upon the properties of the anion exchange resin layer 24 and the diffusion media substrate 22. Typically, the anion exchange resin layer 24 infiltrates the diffusion media substrate such that it coats at least a portion of the fibers inside of the substrate 22 to provide a higher inner surface area that can be more efficient in removing corrosive species from the fuel cell environment.

Typically, in accordance with the present invention, an amount of anion exchange resin is applied to the diffusion media substrate 22 to form the anion exchange resin layer 24. The amount of anion exchange resin is sufficient to neutralize free mineral and organic acids (e.g., HCl, HBr, HF, HI, $H_2SO_4$, $H_3PO_4$, acetic, formic, propionic, and benzoic acids, and combinations thereof) in the exhaust water and eliminate anions (e.g., fluorides, chlorides, sulfates, sulfites, etc.) that are produced during operation of an electrochemical conversion assembly (i.e., fuel cell). Regarding the respective thicknesses a, b of the diffusion media substrate 22 and the anion exchange resin layer 24 illustrated in FIG. 2, it is noted that suitable values will vary depending upon the particular application in which the diffusion media 20 is employed. For example, it is contemplated that carbon fiber paper products having thickness b of about 0.17 mm can be suitable for use in the present invention. The anion exchange resin layer 24 can have a thickness a that is at least about 10 µm, and is typically between about 10 and about 30 µm. This amount of anion exchange resin is enough to provide effective neutralization of $F^-$ and other ions, such as sulfur, but does not affect electrical contact resistance at the interface of the anion exchange resin layer 24 and the diffusion media substrate 22, nor does it affect gas flow to the electrode. The anion exchange resin layer 24 can be applied to the diffusion media substrate 22 by soaking the substrate 22 in a resin solution and then allowing it to dry to form the anion exchange resin layer 24. The anion exchange resin layer 24 loading can be between about 6 and about 10%.

In accordance with another embodiment of the present invention, a device comprising a membrane electrode assembly 30, at least one pair of bipolar plate assemblies, and porous diffusion media 20, as described herein, is provided. The device can comprise a fuel cell. As illustrated in FIGS. 1 and 2, the anion exchange resin layer 24 engages at least a portion of at least one of the first and second major faces 21, 23 of the diffusion media substrate 22, and the membrane electrode assembly 30 is interposed between a pair of the diffusion media substrates 22. The bipolar plate assembly, which can comprise anode and cathode flow field plates 40, 50 as described herein, engages the anion exchange resin layer 24. Accordingly, the membrane electrode assembly 30 can be interposed between the anode flow field 40 and the cathode flow field 50.

In other optional embodiments of the present invention, the anion exchange resin layer 24 engages the first major face 21 of the diffusion media substrate 22, and the bipolar plate assembly engages the anion exchange resin layer 24. Optionally, the device can be configured so that the anion exchange resin layer 24 further engages the second major face 23 of the diffusion media substrate 22, and the membrane electrode assembly 30 engages the anion exchange membrane layer 24 engaging the second major face 23 of the diffusion media substrate 22. The membrane electrode assembly 30 can comprise an ion exchange membrane 34 interposed between and engaged with a pair of catalytic electrode layers 32, which catalytic electrode layer 32 is engaged with the anion exchange resin layer 24 that is engaged with the second major face 23 of the diffusion media substrate 22. In another optional embodiment of the present invention, the catalytic electrode layer 32 is engaged with the porous diffusion media 20 and, more particularly, the second major face 23 of the diffusion media substrate 22. In this particular embodiment, the anion exchange resin layer 24 is not positioned in between the catalytic electrode layer 32 and the second major face 23 of the diffusion media substrate 22. Although, the anion exchange resin layer 24 can be engaged with the first major face 21 of the diffusion media substrate 22.

It is further contemplated in accordance with another embodiment of the present invention that the anion exchange resin layer 24 can be applied to flow field passages defined within the anode and cathode flow fields 40, 50 in order to eliminate anions and neutralize free acids in the product water, which water is formed at the cathode flow field 50. As will be understood by those skilled in the art, the flow field is a component of an electrochemical cell that allows for ingress and egress of fluids such as reactant and waste gases and liquids to and from reaction zones for operation of the fuel cell. As described herein, the resin eliminates anions such as, for example, hydrogen fluoride, from the product water and thereby mitigates the corrosion of the metallic (e.g., stainless alloy) bipolar plate. The thickness of the anion exchange resin layer 24 is typically between about 10 and about 30 µm, which can effectively remove anions within the lifetime of the fuel cell stack (e.g., about 6000 hours).

Figure 3:
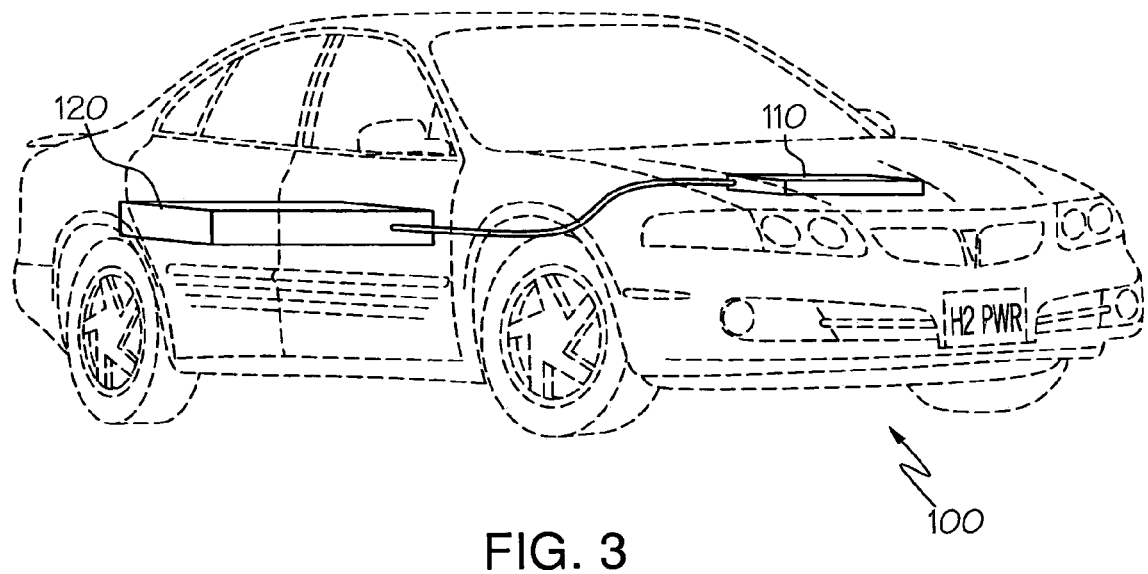
FIG. 3 is a schematic illustration of a vehicle incorporating a fuel cell according to the principals of the present invention.

Referring now to FIG. 3, a fuel cell system incorporating porous diffusion media according to the present invention may be configured to operate as a source of power for a vehicle 100. Specifically, fuel from a fuel storage unit 120 may be directed to the fuel cell assembly 110 configured to convert fuel, e.g., $H_2$, into electricity. The electricity generated is used as a motive power supply for the vehicle 100 where the electricity is converted to torque and vehicle translational motion. Although the vehicle 100 shown in FIG. 3 is a passenger automobile, it is contemplated that the vehicle 100 can be any vehicle now known or later developed that is capable of being powered or propelled by a fuel cell system, such as, for example, automobiles (i.e., car, light- or heavy-duty truck, or tractor trailer), farm equipment, aircraft, watercraft, railroad engines, etc.

It is noted that terms like "preferably", "commonly" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise a porous diffusion media, a fuel cell incorporating a porous diffusion media according to the present invention, a vehicle incorporating a fuel cell according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed is:

1. A device comprising a membrane electrode assembly, and a porous diffusion media adjacent the membrane electrode assembly, said porous diffusion media comprising a diffusion media substrate and an anion exchange resin layer, wherein:
    said diffusion media substrate comprises a fibrous matrix defining opposing first and second major faces, said substrate comprising an amount of carbonaceous material sufficient to render said substrate electrically conductive;
    said anion exchange resin layer engages at least a portion of at least one of said first and second major faces of said diffusion media substrate; and
    said anion exchange resin is configured to eliminate anions through exchange with hydroxyl groups or formation of quaternary ammonium salts.

2. The device of claim 1 wherein said anion exchange resin layer is engaged with at least a portion of said first major face of said diffusion media substrate.

3. The device of claim 1 wherein said anion exchange resin layer is engaged with at least a portion of said second major face of said diffusion media substrate.

4. The device of claim 1 wherein said anion exchange resin layer is engaged with at least a portion of both said first major face and said second major face of said diffusion media substrate.

5. The device of claim 1 wherein said anion exchange resin is comprised of at least one of strong base anion exchange resins, weak base anion exchange resins, and combinations thereof, wherein strong base anion exchange resins are configured to eliminate anions through exchange with hydroxyl groups, and weak base anion exchange resins are configured to eliminate anions through formation of quaternary ammonium salts.

6. The device of claim 1 wherein said anions comprise at least one of fluorides, chlorides, sulfates, sulfites, and combinations thereof.

7. The device of claim 1 wherein said anion exchange resin layer defines a thickness that is sufficient to neutralize free mineral and organic acids in solution.

8. The device of claim 7 wherein said acids comprise at least one of HCl, HBr, HF, HI, $H_2SO_4$, $H_3PO_4$, acetic, formic, propionic, and benzoic acids, and combinations thereof.

9. The device of claim 1 wherein said anion exchange resin layer defines a thickness that is at least about 10 μm.

10. The device of claim 1 wherein said anion exchange resin layer defines a thickness that is between about 10 and about 30 μm.

11. The device of claim 1 wherein said anion exchange resin layer at least partially infiltrates said diffusion media substrate.

12. The device of claim 1 wherein said anion exchange resin layer is characterized by a porosity greater than a porosity of said fibrous matrix of said diffusion media substrate.

13. The device of claim 1 wherein said diffusion media substrate comprises carbon fiber paper.

14. The device of claim 1 wherein said diffusion media substrate defines a thickness of about 0.17 mm.

15. A device comprising a membrane electrode assembly, porous diffusion media, and at least one pair of bipolar plate assemblies wherein:
    said porous diffusion media comprises a diffusion media substrate and an anion exchange resin layer;
    said diffusion media substrate comprises a fibrous matrix defining opposing first and second major faces;
    said diffusion media substrate comprises an amount of carbonaceous material sufficient to render said substrate electrically conductive;
    said anion exchange resin layer engages at least a portion of at least one of said first and second major faces of said diffusion media substrate;
    said anion exchange resin is configured to eliminate anions through exchange with hydroxyl groups or formation of quaternary ammonium salts;
    said membrane electrode assembly comprises an anode layer and a cathode layer and is interposed between a pair of said diffusion media substrates; and
    said bipolar plate assembly engages said anion exchange resin layer.

16. The device of claim 15 wherein each said bipolar plate assembly comprises a cathode flow field and an anode flow field, and wherein said membrane electrode assembly is interposed between said anode flow field and said cathode flow field.

17. The device of claim 15 wherein said anion exchange resin layer engages said first major face of said diffusion media substrate, and said bipolar plate assembly engages said anion exchange resin layer.

18. The device of claim 17 wherein said anion exchange resin layer further engages said second major face of said diffusion media substrate, and said membrane electrode assembly engages said anion exchange resin layer engaging said second major face of said diffusion media substrate.

19. The device of claim 18 wherein said membrane electrode assembly further comprises an ion exchange membrane interposed between and engaged with a pair of catalytic electrode layers, and wherein said catalytic electrode layer is engaged with said anion exchange resin layer engaged with said second major face of said diffusion media substrate.

20. The device of claim 15 wherein said membrane electrode assembly further comprises an ion exchange membrane interposed between and engaged with a pair of catalytic electrode layers, and wherein said catalytic electrode layer is engaged with said porous diffusion media.

21. The device of claim 15 wherein said bipolar plate assembly comprises a flow field, and wherein an anion exchange resin engages said flow field.

22. The device of claim 15 wherein said device comprises a fuel cell.

23. A device comprising a membrane electrode assembly, porous diffusion media, and at least one pair of bipolar plate assemblies wherein
   said membrane electrode assembly is interposed between a pair of diffusion media substrates;
   said bipolar plate assembly comprises at least one flow field passage, said flow field passage comprising an anion exchange resin layer, wherein said anion exchange resin layer is configured to eliminate anions through exchange with hydroxyl groups or formation of quaternary ammonium salts; and
   said bipolar plate assembly engages said diffusion media substrate.

24. A device comprising a membrane electrode assembly, and a porous diffusion media adjacent the membrane electrode assembly, said porous diffusion media comprising a diffusion media substrate and an anion exchange resin layer, wherein
   said diffusion media substrate comprises a fibrous matrix defining opposing first and second major faces, wherein said substrate
      comprises an amount of carbonaceous material sufficient to render said substrate electrically conductive, and
      defines a thickness of about 0.17 mm;
   said anion exchange resin layer engages at least a portion of at least one of said first and second major faces of said diffusion media substrate;
   said anion exchange resin is configured to eliminate anions through exchange with hydroxyl groups or formation of quaternary ammonium salts, and said anion exchange resin comprises at least one of strong base anion exchange resins, weak base anion exchange resins, and combinations thereof, wherein strong base anion exchange resins are configured to eliminate anions through exchange with hydroxyl groups, and weak base anion exchange resins are configured to eliminate anions through formation of quaternary ammonium salts;
   said anion exchange resin layer defines a thickness that is sufficient to remove free mineral and organic acids from solution, said thickness of said anion exchange resin layer being between about 10 and about 30 $\mu$m;
   said anion exchange resin layer at least partially infiltrates said diffusion media substrate; and
   said anion exchange resin layer is characterized by a porosity greater than a porosity of said fibrous matrix of said diffusion media substrate.

* * * * *